United States Patent [19]
Vines, deceased

[11] Patent Number: 5,131,930
[45] Date of Patent: Jul. 21, 1992

[54] PROCESS FOR MIXING GAS STREAMS HAVING DIFFERENT PRESSURES

[75] Inventor: Harvey L. Vines, deceased, late of Macungie, Pa., by Martha Vines, Executrix

[73] Assignee: Air Products and Chemicals, Inc., Allentown, Pa.

[21] Appl. No.: 695,879

[22] Filed: May 6, 1991

[51] Int. Cl.⁵ .............................................. B01D 53/22
[52] U.S. Cl. ............................................ 55/16; 55/68
[58] Field of Search .............................. 55/16, 158, 68

[56] References Cited

U.S. PATENT DOCUMENTS

| 3,241,293 | 3/1966 | Pfefferle | 55/158 X |
| 3,975,170 | 8/1976 | Keating, Jr. | 55/16 |

FOREIGN PATENT DOCUMENTS

| 0149988 | 7/1985 | European Pat. Off. | 55/158 |
| 1-143624 | 6/1989 | Japan | 55/16 |
| 1119718 | 10/1984 | U.S.S.R. | 55/16 |
| 2139110 | 11/1984 | United Kingdom | 55/16 |

Primary Examiner—Robert Spitzer
Attorney, Agent, or Firm—Robert J. Wolff; James C. Simmons; William F. Marsh

[57] ABSTRACT

This invention relates to a method for mixing a lower pressure gas stream into a higher pressure gas stream to achieve a product gas stream which is at the pressure of the higher pressure gas stream. The invention uses a membrane to accomplish what typically is accomplished with a compression step prior to mixing.

4 Claims, 2 Drawing Sheets

PROCESS FOR MIXING GAS STREAMS HAVING DIFFERENT PRESSURES

FIELD OF THE INVENTION

This invention relates to the simultaneous mixing and "compression" of a lower pressure gas stream into a higher pressure gas stream.

BACKGROUND OF THE INVENTION

A common task encountered in many chemical operation is to mix a lower pressure gas stream into a higher pressure gas stream to obtain a product stream which is at a pressure equal to the pressure of the higher pressure gas stream. In a typical hydrogen plant for example, a small portion of the hydrogen product at low pressure must be recycled to the higher pressure natural gas feed to provide hydrogen for the desulfurization of the natural gas. Without first equalizing the pressure of the two streams by either compressing the hydrogen stream or expanding the natural gas steam, no mixing can occur. The hydrogen stream is typically mechanically compressed via compressor to the pressure of the natural gas stream before mixing.

SUMMARY OF THE INVENTION

This invention relates to a method for mixing a lower pressure gas stream into a higher pressure gas stream to achieve a product gas stream which is at a pressure equal to the pressure of the higher pressure gas stream. The invention uses a membrane to accomplish what typically is accomplished with a compression step prior to mixing. The advantage is in the substitution of a membrane for a compressor. A membrane requires little maintenance and has no operating cost while a compressor is maintenance intensive and requires power to operate.

BRIEF DESCRIPTION OF THE DRAWINGS

The drawing of FIG. 1 is a schematic flow diagram of one embodiment of the present invention.

The drawing of FIG. 2 is a schematic flow diagram of the prior art process which utilizes a compression step and a mixing step instead of FIG. I's membrane.

DETAILED DESCRIPTION OF THE INVENTION

Figure 1:
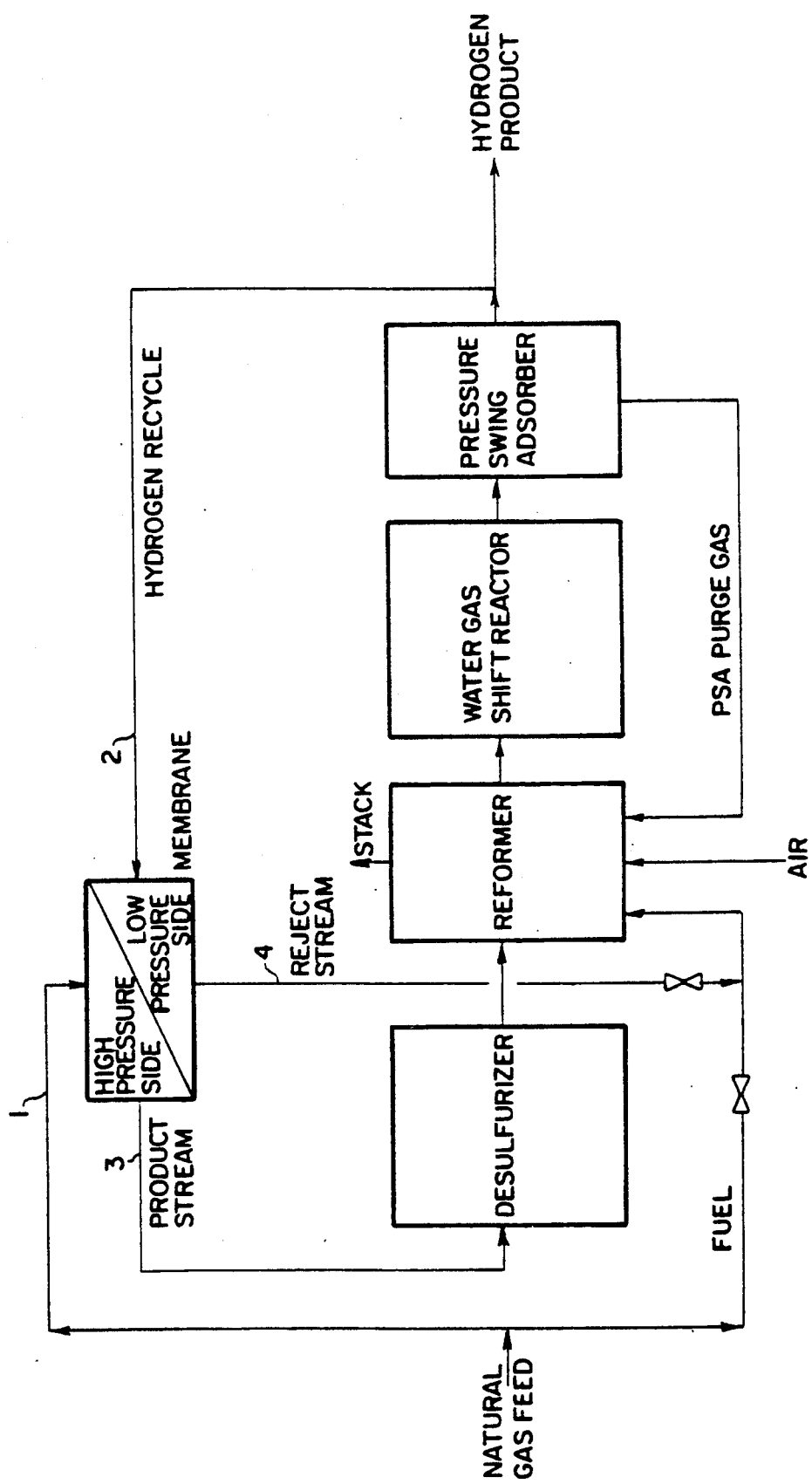
Figure 2:
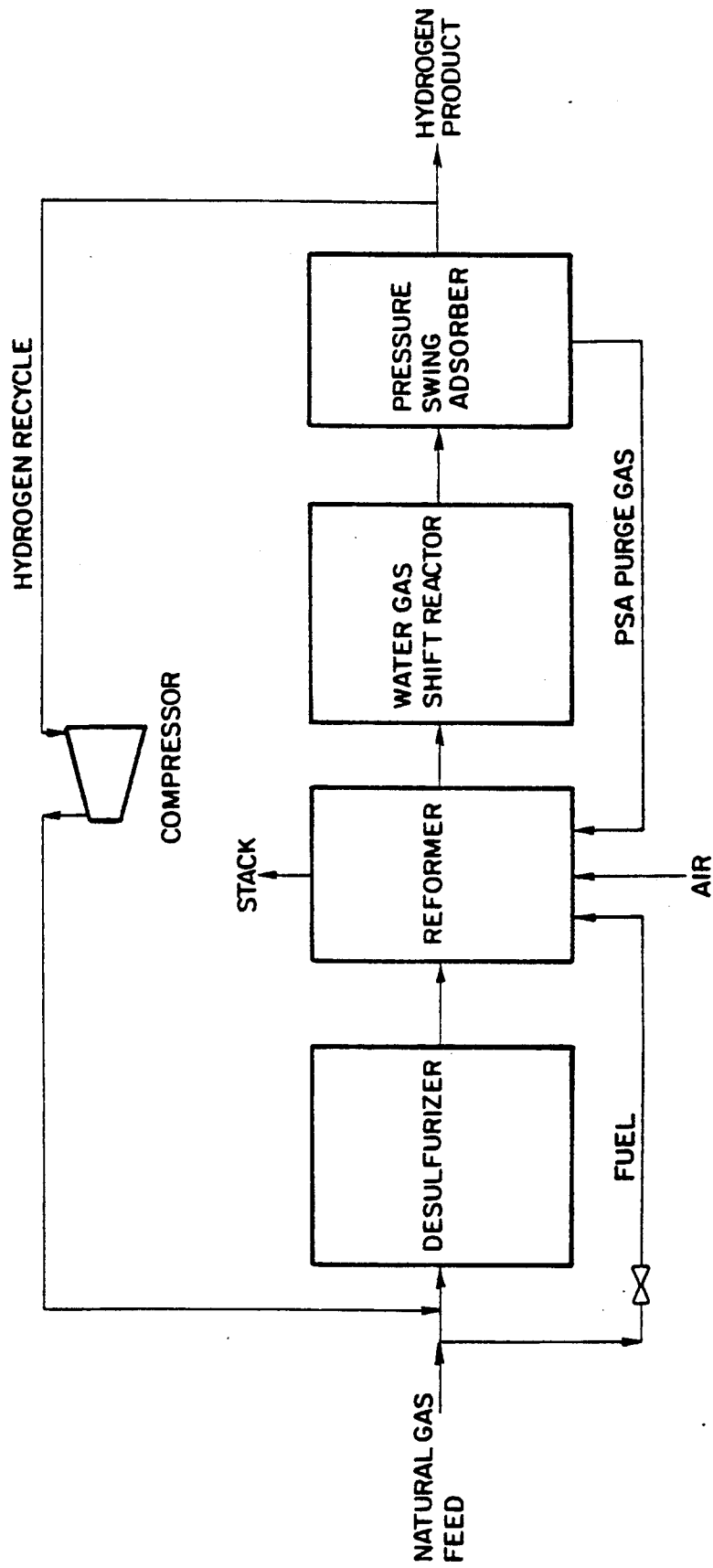

This invention relates to a method for mixing a lower pressure gas stream into a higher pressure gas stream to achieve a product gas stream which is at a pressure equal to the pressure of the higher pressure gas stream. Typically, this operation is accomplished in two steps: first the lower pressure gas stream is mechanically compressed to the pressure of the higher pressure gas stream and second the two gas streams are mixed. The invention allows one to accomplish this operation through the use of an appropriate membrane. A membrane is selected which is selectively permeable toward the lower pressure gas. Upon feeding the higher pressure gas stream to the high pressure side of the membrane while feeding the lower pressure gas stream to the lower pressure side of the membrane, the lower pressure gas stream will permeate into the higher pressure gas stream (via concentration gradient driving force) leaving one with the desired product gas stream which will be at the pressure of the higher pressure gas stream (less any pressure drop across the high pressure side of the membrane). The lower pressure gas stream is in effect "compressed" without any mechanical compression. Instead of a compressor performing the work necessary to upgrade the pressure of the lower pressure gas stream, the membrane performs the same amount of work by holding back the potential energy of the higher pressure gas. The potential energy of the higher pressure gas is created by a concentration gradient driving force which is in the opposite direction of the concentration gradient driving force driving the lower pressure gas into the higher pressure gas. (In the context of gases, a concentration gradient driving force is often referred to as a partial pressure driving force).

It should be noted that, depending on the relative permeabilities of the two gases with respect to the membrane (i.e., the selectivity of the membrane), some of the higher pressure gas will also permeate into the low pressure side of the membrane thereby requiring a purge stream off the membrane. An infinitely selective membrane that will permeate only the lower pressure gas into the higher pressure gas (and not also vis-versa) is theoretically possible but only realized in a few specialized cases.

It should further be noted that the maximum molar concentration of the resultant product stream (with respect to the lower pressure gas) that can be obtained by this invention is limited to a concentration equal to the ratio of the absolute pressure of the lower pressure gas stream divided by the absolute pressure of the higher pressure gas stream. For example, if the absolute pressure of the lower pressure gas stream is 25 psia and the absolute pressure of the higher pressure gas stream is 100 psia, the maximum molar concentration of the lower pressure gas in the product steam that can be obtained is 25/100 or 0.25 or 25%. Once this maximum concentration is obtained, there is no longer a partial pressure driving force to drive the lower pressure gas stream into the higher pressure gas stream. It follows that the invention is not applicable to a situation where the concentration of the lower pressure gas in the higher pressure gas is already equal to or greater than the maximum molar concentration that can be obtained in the product gas stream. Continuing the above example, if the higher pressure gas stream's initial molar concentration of lower pressure gas is already equal to or greater than 25%, the invention has no applicability to such a case.

The present invention is also applicable to the situation where only one or more component(s) of the lower pressure gas stream are desired to be mixed into the higher pressure gas stream. The only modification required is to select a membrane which is selectively permeable only toward such desired component(s). The product stream's maximum obtainable molar concentration in such a situation also changes. It becomes equal to the product of the ration of the absolute pressures (as calculated above) multiplied by the molar concentration of the lower pressure gas stream with respect to the desired component(s). For example, assume a case where the lower pressure stream is at an absolute pressure at 25 psia and contains a 50/50 molar mixture of gas A and gas B while the higher pressure steam is at 100 psia. Assume further that only gas A is desired to be mixed into the higher pressure stream. In such a case, the membrane selected would be selectively permeably only toward gas A while the product stream's maximum obtainable concentration with respect to gas A is $(25/100)(\frac{1}{2})$ or 0.125 or 12.5%.

EXAMPLE

To illustrate the practice of this invention, Applicants have simulated the hydrogen plant process as depicted in FIG. I where a portion of the lower pressure hydrogen product stream (stream 2) must be mixed into the higher pressure natural gas feed stream (stream 1) to provide hydrogen for the desulfurization of the natural gas feed. Computer simulation is well recognized in the art as a means of evaluating the performance of a membrane.

A membrane is selected which is selectively permeable toward hydrogen vis a vis natural gas. In this example, a state of the art cellulose acetate membrane is selected which has a selectivity for hydrogen relative to natural gas of fifty-seven. The higher pressure natural gas stream in FIG. I (stream 1) is fed into the high pressure side of the membrane at a rate of 100.0 lb mole/hr while the lower pressure hydrogen gas stream in FIG. I (stream 2) is fed into the lower pressure side of the membrane at a rate of 2.0 lb mole/hr. The resultant high pressure product stream in FIG. I (stream 3) is collected from the high pressure side of the membrane at a rate of 101.0 lb mole/hr and contains the desired 1.0 mole % hydrogen. The pressure of the product stream will be the pressure of the higher pressure natural gas feed stream less any pressure drop across the high pressure side of the membrane. Because the membrane is not infinitely selective, there will also be a purge stream (stream 4 in FIG. I) which is used as supplemental fuel. The purge stream has a flow rate of 1.0 lb mole/hr and contains 97.6% hydrogen. The pressure of the purge stream will be the pressure of the lower pressure hydrogen gas feed stream less any pressure drop across the lower pressure side of the membrane.

Having thus described the invention, what is desired to be secured by letters patents of the United States is set forth in the following claims.

What is claimed is:

1. A method for mixing a lower pressure gas stream at absolute pressure $P_1$ into a higher pressure gas stream at absolute pressure $P_2$ to achieve a product gas stream having (1) a pressure substantially equal to the higher absolute pressure $P_2$ and (2) a molar concentration of the lower pressure gas less than or equal to the ration $P_1/2$ comprising the steps of:
    a) selecting a semi-permeable membrane having a high pressure side and a lower pressure side, and which membrane is selectively permeable towards the lower pressure gas stream;
    b) feeding the higher pressure gas stream to the high pressure side of the membrane;
    c) concurrently feeding the lower pressure gas stream to the low pressure side of the membrane;
    d) collecting the product gas stream from the high pressure side of the membrane.

2. The method of claim 1 wherein the lower pressure gas stream is hydrogen and wherein the higher pressure gas stream is natural gas.

3. A method for mixing a component of a lower pressure gas stream at absolute pressure $P_1$ into a higher pressure gas stream at absolute pressure $P_2$ to achieve a product gas stream having (1) a pressure substantially equal to the higher absolute pressure $P_2$ and (2) a molar concentration of the component less than or equal to the ration $P_1/P_2$ multiplied by the molar concentration of the component in the lower pressure stream comprising the steps of:
    a) selecting a semi-permeable membrane having a high pressure side and a lower pressure side, and which membrane is selectively permeable towards the component of the lower pressure gas stream;
    b) feeding the higher pressure gas stream to the high pressure side of the membrane;
    c) concurrently feeding the lower pressure gas stream to the lower pressure side of the membrane;
    d) collecting the product gas stream from the high pressure side of the membrane.

4. A method for mixing two or more components of a lower pressure gas stream at absolute pressure $P_1$ into a higher pressure gas stream at absolute pressure $P_2$ to achieve a product gas stream having (1) a pressure substantially equal to the higher absolute pressure $P_2$ and (2) a molar concentration of the components less than or equal to the ration $P_1/P_2$ multiplied by the molar concentration of the components in the lower pressure gas stream comprising the steps of:
    a) selecting a semi-permeable membrane having a high pressure side and a lower pressure side, and which membrane is selectively permeable towards the components of the lower pressure gas stream;
    b) feeding the higher pressure gas stream to the high pressure side of the membrane;
    c) concurrently feeding the lower pressure gas stream to the lower pressure side of the membrane;
    d) collecting the product gas stream from the high pressure side of the membrane.

* * * * *